(No Model.)
T. THOMPSON.
FISH TRAP.
No. 361,470. Patented Apr. 19, 1887.
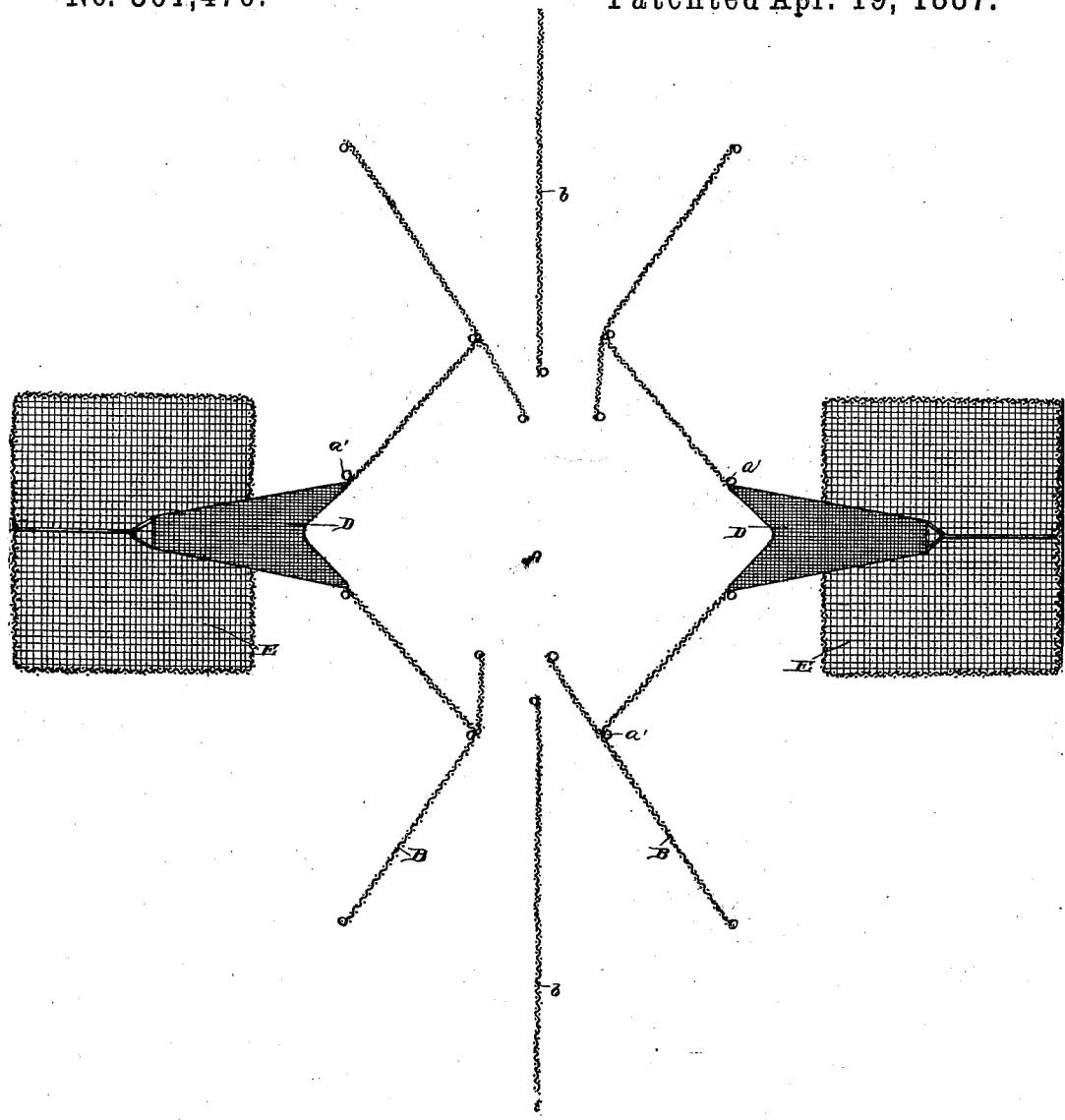
Witnesses
John Enders Jr.
Inventor
Thomas Thompson,
By his Attorney
Allan Rutherford

UNITED STATES PATENT OFFICE.

THOMAS THOMPSON, OF EDENTON, NORTH CAROLINA, ASSIGNOR OF ONE-THIRD TO ALLAN RUTHERFORD, OF WASHINGTON, D. C.

FISH-TRAP.

SPECIFICATION forming part of Letters Patent No. 361,470, dated April 19, 1887.

Application filed February 21, 1887. Serial No. 228,350. (No model.)

*To all whom it may concern:*

Be it known that I, THOMAS THOMPSON, a citizen of the United States, residing at Edenton, in the county of Chowan and State of North Carolina, have invented certain new and useful Improvements in Fish - Traps; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

This invention pertains to certain new and useful improvements in fish-traps, being designed more particularly as an improvement on Letters Patent No. 357,767, granted to me December 7, 1886; and it consists in the construction, combination, and arrangement of the parts, substantially as hereinafter fully set forth, and particularly pointed out in the claim.

In the accompanying drawing the figure is a plan view of my invention.

In carrying out my invention I construct the "heart" or main compartment A of four oppositely - disposed walls, *a a*, of approximately diamond shape. These walls are made of ordinary fish-netting and are secured at their ends and central portions by means of upright stakes *a'*, the connection between said stakes and the netting being effected by ordinary means.

B B are two oppositely-disposed walls diverging at their outer ends, the inner ends of which are projected a short distance within the opposite open ends of the heart or main compartment A, said inwardly-projecting ends being extended in opposite directions toward the side corners of the heart or main compartment, as shown in the figure the purpose of which will soon appear. A central guide-wall, *b*, is secured between the walls B B and extended to about on a line with the open ends of the heart or main compartment, whereby the fish are guided into said heart.

To the opposite side corners of the heart or main compartment are secured approximately cone-shaped tunnels D, which at their ends are made to conform to the angles of the said corners, as shown. The other free ends of said tunnels are caused to project within a "pound" or trap, E, to the opposite wall of which is connected a cord, by which the inclosed end of the tunnel D is secured or held in position.

The principal advantage of my present invention is that I provide a heart or compartment having two openings or leads, the inner ends of which are so arranged as to affect the direction of travel of the fish, which in each instance will be toward the two oppositely-disposed pounds or traps, and upon entering the heart or main compartment the fish will irresistably be impelled toward one of the pounds or traps, and, passing through the cone-shaped tunnels, will be held within said pounds or traps until their removal is desirable.

Having thus fully described my invention, what I claim, and desire to secure by Letters Patent, is—

In a fish-trap having two pounds or traps secured at opposite corners of the heart or main compartment, the convergent walls converging from a point some distance beyond the heart or main compartment on either side of the central guide-wall, and having their inner ends entering the openings of said heart or compartment and bent from the points of such entrance in opposite directions toward each of said pounds or traps, respectively, so as to direct the travel of the fish, as shown and described.

In testimony whereof I affix my signature in presence of two witnesses.

THOMAS THOMPSON.

Witnesses:
A. J. BATEMAN,
J. A. HARRELL.